United States Patent
Yamasaki (10) Patent No.: US 8,325,391 B2
(45) Date of Patent: Dec. 4, 2012

(54) IMAGE READING DEVICE AND IMAGE FORMING APPARATUS HAVING THE SAME

(75) Inventor: Shunsuke Yamasaki, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 645 days.

(21) Appl. No.: 12/559,014

(22) Filed: Sep. 14, 2009

(65) Prior Publication Data

US 2010/0165418 A1    Jul. 1, 2010

(30) Foreign Application Priority Data

Dec. 25, 2008 (JP) ................................. 2008-329698

(51) Int. Cl.
*H04N 1/04* (2006.01)
*H04N 1/42* (2006.01)

(52) U.S. Cl. ......... 358/474; 358/476; 358/496; 358/497

(58) Field of Classification Search .................. None
See application file for complete search history.

(56) References Cited

U.S. PATENT DOCUMENTS

2007/0127962 A1 * 6/2007 Fukumura .................. 399/367

FOREIGN PATENT DOCUMENTS

| JP | 10-322526 | | 12/1998 |
|---|---|---|---|
| JP | 2003-051906 | | 2/2003 |
| JP | 2005-130347 | | 5/2005 |
| JP | 2005130347 A | * | 5/2005 |
| JP | 2006-184823 | | 7/2006 |

* cited by examiner

*Primary Examiner* — Thierry Pham
(74) *Attorney, Agent, or Firm* — K&L Gates LLP

(57) ABSTRACT

A rear side surface of a frame of an image-forming apparatus has throttle portions protruding toward the inside of the frame. By aligning the screw holes in the throttle portions and the through-holes in a guide rail and then screwing screws into these holes, the guide rail is fixed to the rear side surface with a predetermined distance therebetween. This restricts deformation of the guide rail due to a load applied by opening and closing the document holding plate.

14 Claims, 11 Drawing Sheets

IMAGE READING DEVICE AND IMAGE FORMING APPARATUS HAVING THE SAME

INCORPORATION BY REFERENCE

This application is based upon and claims the benefit of priority from the corresponding Japanese Patent application No. 2008-329698, filed Dec. 25, 2008, the entire contents of which are incorporated herein by reference.

BACKGROUND

1. Field of the Invention

The present invention relates to image-reading devices used in facsimiles and copiers, and to image-forming apparatuses having same.

2. Description of the Related Art

It is known to provide internal-output type image-forming apparatus, such as facsimiles and copiers, which have an image-forming section in the central portion of the main body thereof and an image-reading section at the uppermost portion thereof. A sheet that is provided with an image is moved to a space between the image-forming section and the image-reading section.

Because of its structure, such an internal-output type image-forming apparatus tends to be tall. To reduce the height of the apparatus, a reduction in the thickness of the image-reading section is required. However, because of a rotation moment generated at a hinge where the image-reading section is fixed when the document conveying portion is opened and closed, the image-reading section is subjected to a large load due to the rotation moment. This can distort or deform the image-reading section. If the image-reading section is distorted or deformed, the positional relationship between the scanning unit and the optical unit that is located in the image-reading section can be affected, adversely affecting the image-reading performance. Thus, the structure of the image-reading section itself needs to be strengthened so as not to be distorted or deformed. This, however, not only prevents reducing the thickness and weight of the image-reading section, but also is disadvantageous from the standpoint of costs.

Consequently, a method for reducing the load applied to the image-reading section due to a rotation moment about the hinge to thereby enable a reduction in the thickness of the image-reading section has been proposed. Japanese Unexamined Patent Application Publication No. 2003-51906 discloses an image-forming apparatus in which a load applied to the image-reading section is reduced by fixing the hinge unit to a post connecting the image-reading section and the image-forming section thereby distributing the load, generated by the rotation moment, to the post.

Furthermore, Japanese Unexamined Patent Application Publication No. 2005-130347 discloses a method for reducing a load applied to the image-reading section due to the rotation moment by providing an embossed portion at least a part of a frame of the image-reading device.

However, with the method disclosed in Japanese Unexamined Patent Application Publication No. 2003-51906, because the hinge unit is fixed to the post of the image-reading section, the rotation moment about the hinge unit is, to some extent, transmitted to the image-reading section via the post. Thus, it is difficult to completely prevent the load from being applied to the image-reading section and to assure the prevention of the deformation of the image-reading section. Furthermore, the weight of the document conveying unit varies depending on the model, and because, for example, an image-forming apparatus capable of high-speed processing can hold a large number of documents, the size and weight of the document conveying unit is large. Accordingly, it is assumed that the load applied to the image-reading section via the post is also large.

With the method disclosed in Japanese Unexamined Patent Application Publication No. 2005-130347 too, although the embossed portion enhances the rigidity of the frame, it is difficult to completely prevent deformation of the rear side surface to which the hinge unit is attached, due to the opening and closing of the document conveying unit. There is also a problem in that, because the rear side surface usually has a guide rail for moving a carriage that carries a lamp and a mirror, a deformation of the rear side surface also causes a deformation of the guide rail. This can adversely affect the image-reading accuracy. Although image-reading devices having the document conveying units have been described herein, image-reading devices having only document holding plates also, more or less, have the same problem.

SUMMARY

The present invention provides an image-reading device capable of restricting deformation of the guide rail due to the opening and closing of the document holding portion, and image-forming apparatus having same.

To achieve the above-described advantage, an image-reading device according to an embodiment of the present invention includes: a frame, a guide rail disposed in the frame, an image-reading section positioned in the frame and including a scanning optical unit that scans a document and forms an image on an imaging device, and a carriage that carries the scanning optical unit and is movable along a guide rail; a document holding plate that covers a top surface of the image-reading section; and a hinge unit attached to the frame, and supporting the document holding plate on the image-reading section so as to be rotatable. The guide rail is attached to the inside of a side surface of the frame, to which the hinge unit is attached, in such a manner that only part of the guide rail is in contact therewith either directly or indirectly.

In an embodiment, the image-reading device includes a document conveying unit that is provided on the document holding plate and feeds a document to a reading position.

In an embodiment of the image-reading device, the side surface of the frame has a plurality of throttle portions protruding toward the inside of the frame. The guide rail is attached to the throttle portions.

In an embodiment of the image-reading device, a surface of the guide rail facing the frame has a plurality of throttle portions protruding toward the frame. The guide rail is attached to the side surface of the frame via the throttle portions.

In an embodiment of the image-reading device, the guide rail is attached to the side surface of the frame via a spacer.

In an embodiment of the image-reading device, a plurality of the hinge units are attached to the side surface of the frame, at positions shifted from the corners toward the center. Portions near the ends of the guide rail are each fixed to a corresponding one of the portions near the corners of the side surface of the frame, at a position away from the corresponding hinge unit.

An image-forming apparatus according to another embodiment of the present invention includes an image-forming section for forming an image on a sheet and the image-reading device having the above-described structure.

The present invention has a structure in which a guide rail is attached to the inside of the side surface of the frame, to which the hinge unit is attached, in such a manner that only part of the guide rail is in contact therewith either directly or indirectly. Thus, a gap is formed between the guide rail and the side surface of the frame. Accordingly, even if the side surface of the frame of the image-reading section is deformed due to the opening and closing of the document holding portion, the resulting deformation of the guide rail can be restricted.

Because this reduces the occurrence of image-reading errors due to the deformation of the guide rail, a more compact image-reading device producing higher image quality, and an image-forming apparatus having such an image-reading device, can be provided.

Additional features and advantages are described herein, and will be apparent from the following Detailed Description and the figures.

DETAILED DESCRIPTION

Figure 1:
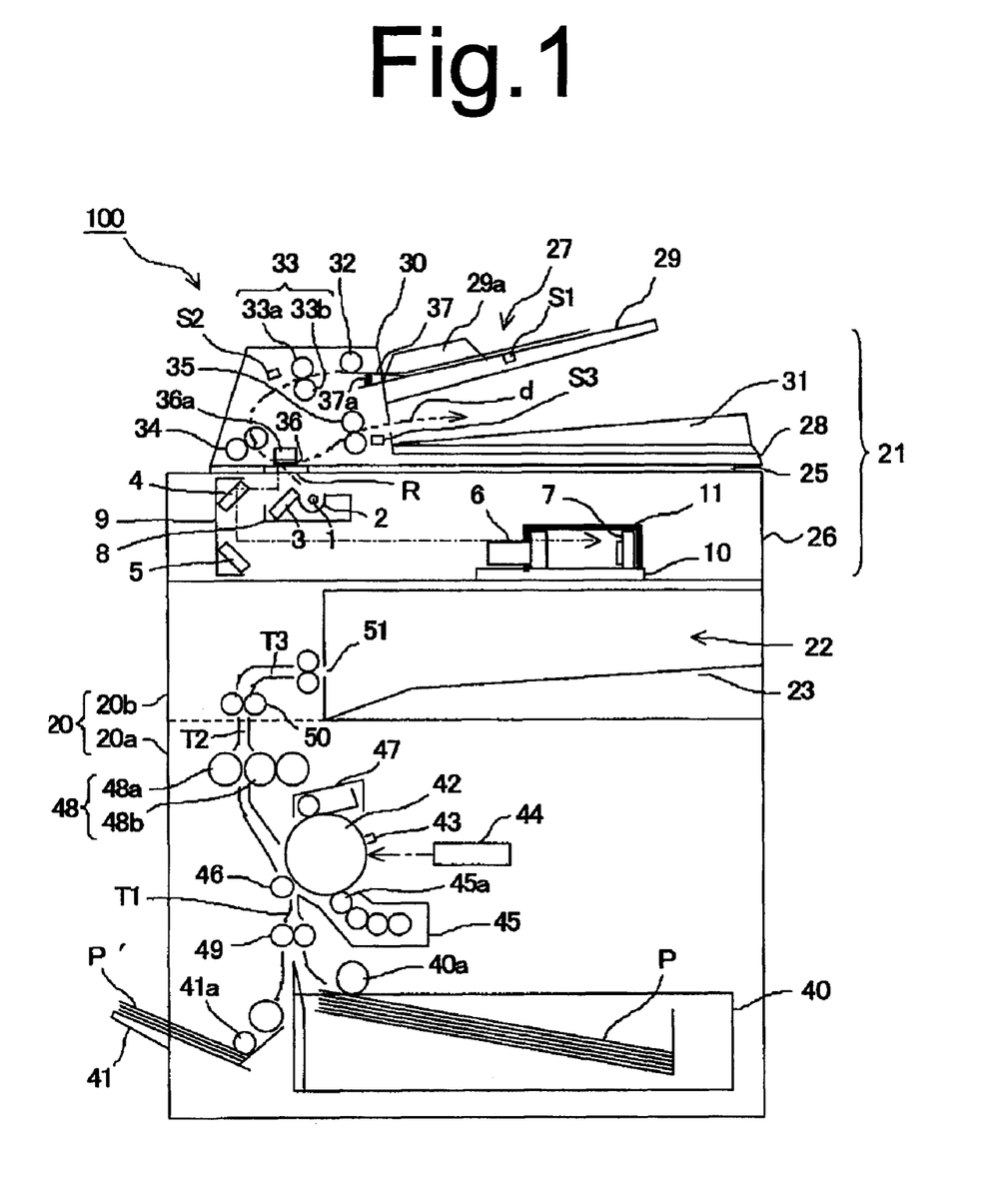
FIG. 1 is a front cross-sectional view of an embodiment of an image-forming apparatus having an image-reading device of the present invention.

Embodiments of the present invention will now be described below with reference to the drawings. FIG. 1 is a front cross-sectional view showing the internal structure of an image-forming apparatus having an image-reading device of the present invention.

As shown in FIG. 1, the image-forming apparatus 100 is what is known as an internal-output type digital copier, and basically includes a main body housing 20 and an image-reading device 21 located thereon. The image-reading device 21 includes an image-reading section 26 having various mechanisms (described below) for reading an image on the document as an electric signal and a document conveying unit 27 that sequentially feeds a plurality of documents to an image-reading position. The main body housing 20 accommodates various mechanisms (described below) for transferring an image onto a sheet based on the electric signal of the image on the document that was read in the image-reading device 21.

The main body housing 20 includes a lower housing 20a and a connection housing 20b that is located thereon along the left side portion and is connected to the image-reading device 21. The lower housing 20a includes: a sheet feed section for accommodating and feeding sheets; an image-forming section for forming toner images on the sheets; and a fixing section for fixing the toner images onto the sheets. The connection housing 20b includes a sheet output section for feeding and outputting the sheets after the fixing step. Furthermore, an internal sheet-output space 22 that opens widely on the right side surface and front surface is formed on the right side of the connection housing 20b, immediately below the image-reading device 21. The internal sheet-output space 22 has a sheet output tray 23 for receiving and stacking the sheets that are horizontally outputted from the right side surface of the connection housing 20b.

The image-reading section 26 has, on the top surface thereof, a contact glass (document stage) 25 and an operation panel (not shown) on the front side. In addition, in the upper portion of the image-reading device 21, a document holding plate 28 having the document conveying unit 27, which feeds a sheet-like document to an image-reading position R on the contact glass 25, is supported on the back side of the image-reading section 26 via hinge units so as to be capable of being opened and closed. The document holding plate 28 can either be in a closed state, wherein it covers the contact glass 25 allowing the document to be read, or in an open state, wherein it does not cover the contact glass 25.

The document conveying units 27 includes a document feeding tray 29 that holds a plurality of properly arranged documents. The document feed tray 29 has a document guide 29a, a conveying cover 30 that is located above the image-reading position R on the contact glass 25 and has the document feeding tray 29 projecting therefrom, and a document output tray 31 formed directly on a part of the top surface of the document holding plate 28, next to the conveying cover 30. A document conveying path d extends from the document feeding tray 29 through the inside of the conveying cover 30 to the document output tray 31.

The conveying cover 30 accommodates a document conveying means that includes, sequentially from the upstream side of the document conveying path d, a pick-up roller 32, a conveying roller pair 33, a regist roller pair 34, and an output roller pair 35. The conveying roller pair 33 includes a driving roller 33a and a separation roller 33b. The separation roller 33b rotates in a direction that is opposite to the direction of rotation of the feeding roller 33a only when the rotational load is less than a predetermined torque, and rotates in a manner driven by the feeding roller 33a when the rotational load is greater than the predetermined torque.

A white reference plate 36 for shading correction, which is opposite to the image-reading position R on the contact glass 25, and a document pressing portion 36a, which is located above the white reference plate 36 and presses the white reference plate 36 toward the image-reading position R, are provided between the regist roller pair 34 and the output roller pair 35. The document conveying path d is curved between the conveying roller pair 33 and the image-reading position R so that the sheet is reversed.

A plurality of sensors for detecting the presence of a document are provided along the document conveying path d. For example, a document detection sensor S1 is provided at the central portion of the document feeding tray 29, a sheet-feed sensor S2 is provided on the downstream side of the conveying roller pair 33, and an output sensor S3 is provided on the downstream side of the output roller pair 35. The document conveying means feeds the documents placed on the document feeding tray 29 one at a time through the document conveying path d. The documents that pass through the image-reading position R are sequentially outputted on the document output tray 31. A user can remove the documents from the document output tray 31.

Now, the feeding of documents using a sheet-through method with a document conveying unit 27 will be described. In the conveyance of the document using the sheet-through method, first, a plurality of documents, which are loaded on the document feeding tray 29 with the surfaces having images (image surfaces) facing up, are pressed against the pick-up roller 32 by a lifting plate 37 that is urged upwardly with a predetermined pressure by a spring member 37a. When a "START" key on the panel is turned on, a primary sheet-feed driving unit (not shown) rotates and drives the pick-up roller 32 and the conveying roller pair 33.

The pick-up roller 32 moves some of the documents loaded on the document feeding tray 29, usually those located in the upper portion, to the conveying roller pair 33. The uppermost sheet is separated by the separation roller 33b from the other documents that were fed to the conveying roller pair 33 and is fed toward the regist roller pair 34. At this time, once the document is fed a predetermined distance, after the leading edge thereof is detected by the sheet-feed sensor S2, the operation of the primary sheet-feed driving means is stopped. This stops the rotation of the driving roller 33a of the conveying roller pair 33 and the pick-up roller 32, completing the primary sheet feeding. After the primary sheet feeding is stopped, the document is in a state wherein the leading edge thereof is pressed to the nip of the regist roller pair 34 and the leading edge portion is bent.

When a predetermined period of time has passed after completion of the primary sheet feeding, a secondary sheet feeding is started. That is, the secondary sheet-feed driving means (not shown) rotates and drives the regist roller pair 34. The regist roller pair 34 feeds the document via the image-reading position R to the output roller pair 35, which outputs the document on the document output tray 31. At this time, the output sensor S3 detects the passing of the trailing edge of the document, whereby completion of the reading of the image on the document is detected.

The output sensor S3 has a count function and counts the number of documents every time the feeding and the conveyance of the document is completed. If the document detection sensor S1 detects a subsequent document, the conveyance of the subsequent documents is continued in the same way as above. When the document passes the image-reading position R, the document is fed while being lightly pressed against the contact glass 25 by the white reference plate 36 and the document pressing portion 36a, and the image on the document is read through the image-reading position R.

Now, the structure of the image-reading section 26 that reads the image on the document as an electric signal will be described with reference to FIG. 1. In the image-reading section 26, on the base plate 10, are located a lamp 1 that serves as a light source for emitting light onto the image surface of the document, and a reflection plate 2 that guides the light from the lamp 1 to the image surface of the document. A series of mirrors are provided, specifically a first mirror 3 that directly receives and reflects the light that is reflected from the document, a second mirror 4 that receives and reflects the light that is reflected from the first mirror 3, and a third mirror 5 that receives and reflects the light that is reflected from the second mirror 4. Also, on the base plate is a lens barrel 6 having a group of lenses (not shown) that receive and condense the light reflected from the third mirror 5, and a photoelectric conversion element (for example, a line-type CCD) 7 that receives the light reflected from the document, having been condensed by the group of lenses in the lens barrel 6, and converts the light into an electric signal. The optical path of the light reflected from the document is indicated by the long and short dash line.

The lamp 1, the reflection plate 2, and the first mirror 3 are integrally fixed on the first carriage 8, and the second mirror 4 and the third mirror 5 are integrally fixed on the second carriage 9. The first carriage 8 and the second carriage 9 are independent of each other, but, are capable of reciprocating in conjunction with each other. That is, when reading the image on a document using the above-described sheet-through method, the first carriage 8 moves to and is maintained at a position immediately below the image-reading position R, and the second carriage 9 is maintained at a predetermined position. On the other hand, when a flat-bed method is used, wherein the document is held stationary, the first carriage 8 and the second carriage 9 are mutually reciprocate (scan) while maintaining the optical path length of the light reflected from the document constant.

With this structure, light is emitted from the lamp 1 and is reflected off the image surface of the document. The light is then reflected to the first mirror 3, the second mirror 4, and the third mirror 5, and is introduced into the group of lenses in the lens barrel 6 to be condensed. Then, the condensed light forms an image on the photoelectric conversion element 7. The photoelectric conversion element 7 performs a photoelectric conversion, and the image on the document is read as an electric signal.

Next, referring to FIG. 1, the structures of the mechanisms, provided in the main body housing 20, for transferring the image onto a sheet based on the electric signal of the document that was read will now be described. First, the sheet feed section will be described. The lower housing 20a accommodates, at a bottom thereof, a feeding cassette 40 that contains sheets of various sizes. The sheets can be inserted or removed from the front side of the feeding cassette 40. Sheets P stored in the feeding cassette 40 are fed one at a time by a feeding roller 40a. The lower housing 20a also has a manual feed tray 41, which can be pulled down when needed, at a lower part of the left side surface, and sheets (including OHP sheets) P' placed on the manual feed tray 41 are fed one at a time by a feeding roller 41a.

Next, the image-forming section for forming toner images on the sheets and the fixing section for fixing the toner images on the sheets will be described. A photosensitive drum 42 that principally constitutes the image-forming section is located above the feeding cassette 40 in the lower housing 20a. A charging unit 43, a laser exposure unit 44, a developing unit 45, a transfer roller 46, and a cleaning unit 47 are positioned around the photosensitive drum 42. In the lower housing 20a, a fixing unit 48 is located above the transfer roller 46 and immediately below the connection housing 20b.

The photosensitive drum 42 is made of positively charged amorphous silicon and rotates in a clockwise direction in FIG. 1 at a predetermined peripheral velocity. The surface of the photosensitive drum 42 is uniformly charged by a corona discharge generated by the charging unit 43 to which a high voltage is applied, and is then irradiated with a beam emitted from the laser exposure unit 44 based on the electric signal of the image on the document from the photoelectric conversion element 7. Thus, an electrostatic latent image consisting of predetermined light potential portions and dark potential portions is formed.

The rotation of the photosensitive drum 42 brings the electrostatic latent image to a developing position. A developing roller 45a is provided, which constitutes the developing unit 45, and is made of stainless steel, having a stationary magnet therein. The developing roller 45a is supported so as to be rotatable at a predetermined distance from the photosensitive drum 42 and, when driven, is rotated in the same direction as the photosensitive drum 42 at a predetermined peripheral velocity. The developing unit 45 contains positively charged magnetic toner. A magnetic blade (not shown) forms a thin toner layer on the surface of the developing roller 45a. A predetermined developing bias voltage is applied to the developing roller 45a. The developing bias voltage causes the toner that has reached a developing area to move from the surface of the developing roller 45a to the electrostatic latent image formed on the surface of the photosensitive drum 42, whereby a toner image is formed (developed).

The sheet P (P') that is fed from the feeding cassette 40 (manual feed tray 41) and reaches the regist roller pair 49 is, in synchronization with the toner image on the photosensitive drum 42 approaching the transfer roller 46, then fed upwards while the conveyance timing thereof is adjusted by the regist roller pair 49. The sheet P is fed to the nip between the photosensitive drum 42 and the transfer roller 46 through a conveying path T1. Then, as the leading end of the sheet P and the leading end of the toner image simultaneously pass the transfer roller 46, most of the toner of the toner image is transferred to the sheet P.

The toner that was not transferred to the sheet P and remains on the surface of the photosensitive drum 42 is removed from the photosensitive drum 42 by the cleaning unit 47. The sheet P on which the toner image was transferred is sent to the fixing unit 48. The fixing unit 48 includes a fixing roller pair consisting of a heating roller 48a and a pressing roller 48b. The fixing roller pair heats, presses, and fixes the visible toner image on the sheet P that passes through the nip, whereby the transferred image is fixed on the sheet P.

The sheet P having passed through the fixing unit 48 is fed along a vertical conveying path T2 that extends vertically upward into the connection housing 20b. The connection housing 20b accommodates a conveying roller pair 50 connected to the vertical conveying path T2 and an output roller pair 51 for outputting the sheet P on the sheet output tray 23. The sheet P having left the conveying roller pair 50 passes through a conveying path T3 and reaches the output roller pair 51, from where the sheet P is outputted on the sheet output tray 23.

Figure 2:
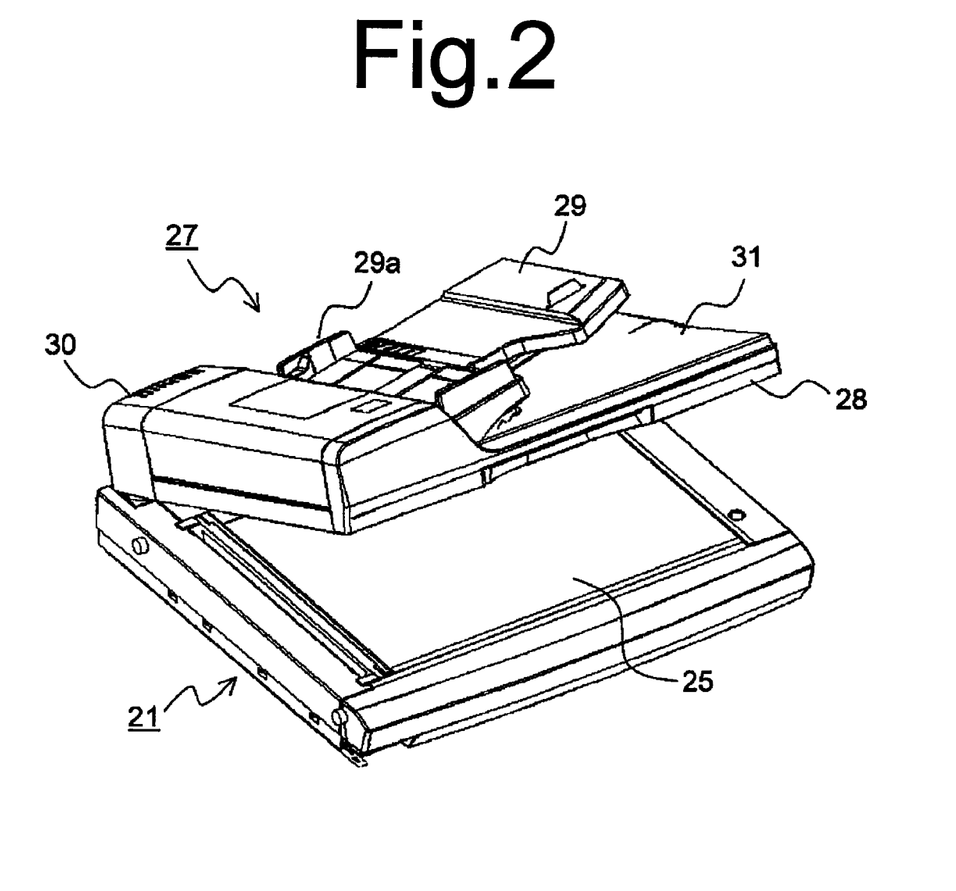
FIG. 2 is a front external perspective view of an embodiment of the image-reading device of the present invention.
Figure 3:
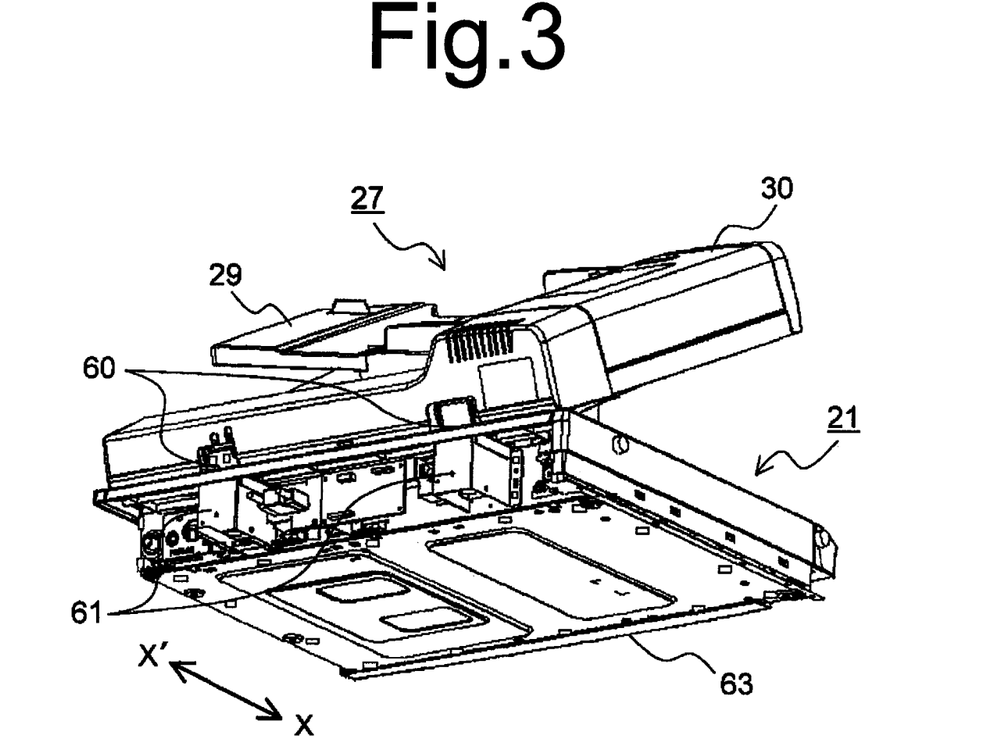
FIG. 3 is a back external perspective view of an embodiment of the image-reading device of the present invention.

FIGS. 2 and 3 are front and back perspective views, respectively, of an embodiment of the image-reading device of the present invention. The elements that are the same as those in FIG. 1 are denoted by the same reference numerals and the explanations thereof will be omitted. The document conveying unit 27 is attached to the image-reading section 26 via hinge unit 60, which serve as the fulcrum, so as to be rotatable from an open state to a closed state. The hinge unit 60 is formed of known cam sliders or springs and allows the document conveying unit 27 to be moved with a predetermined force and stopped at a predetermined angle.

When the document conveying unit 27 is opened, most of the weight of the document conveying unit 27 is applied to hinge receivers 61. Then, a moment in the front-rear direction of the apparatus (direction indicated by arrow X-X') produced by the opening or closing of the document conveying unit 27 is transmitted via the hinge receivers 61 to a rear side surface 66b (see FIG. 4) of the frame 63.

Figure 4:
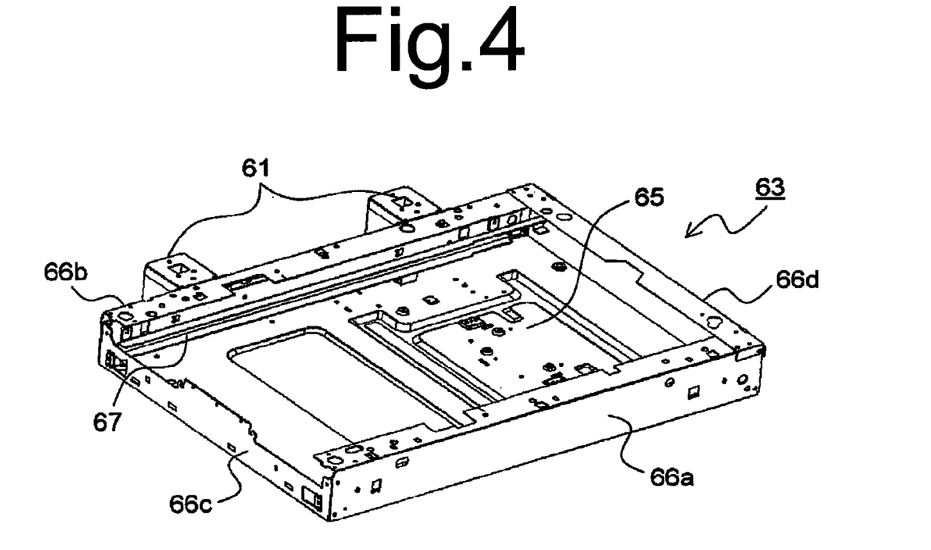
FIG. 4 is a front perspective view of a frame of an image-reading device according to an embodiment of the present invention.
Figure 5:
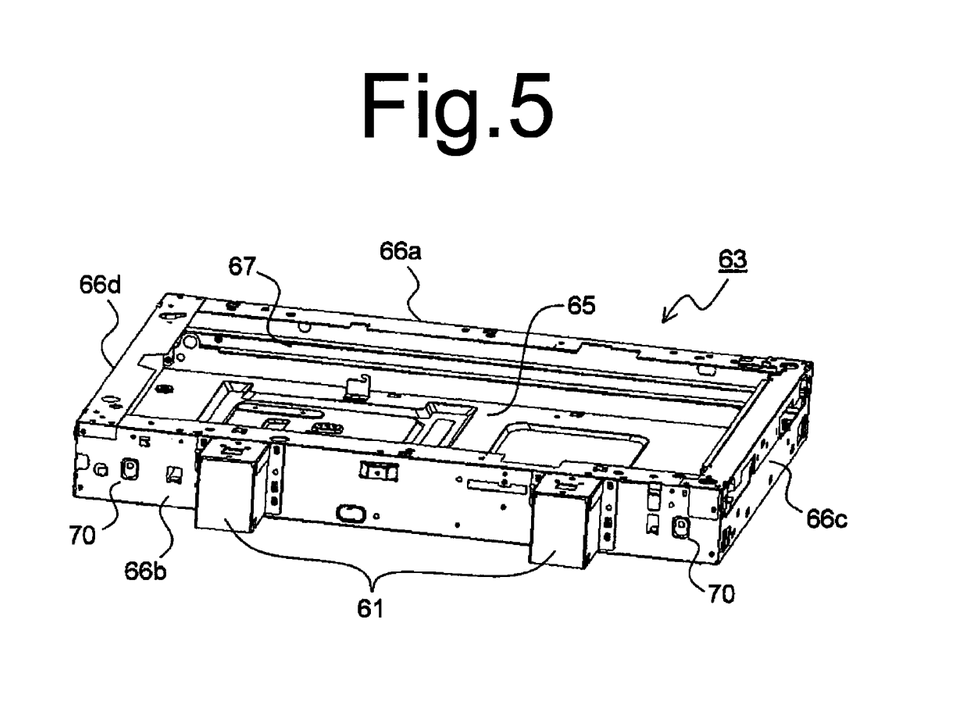
FIG. 5 is a back perspective view of the frame of the image-reading device according to the embodiment of FIG. 4.
Figure 6:
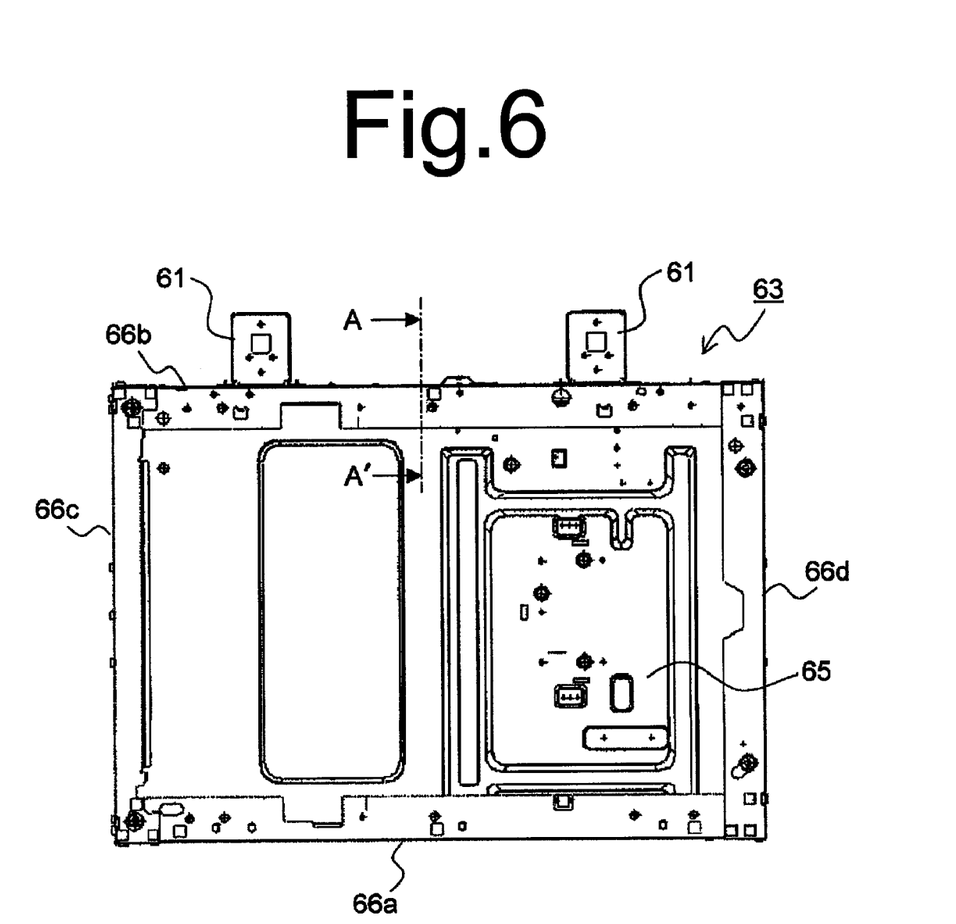
FIG. 6 is a plan view of the frame of the image-reading device according to the embodiment of FIG. 4.

FIGS. 4 and 5 are front and back perspective views, respectively, of the frame constituting the image-reading device according to an embodiment of the present invention, and FIG. 6 is a plan view of the frame. The frame 63 includes a bottom surface 65, a front side surface 66a, the rear side surface 66b, a left side surface 66c, and a right side surface 66d, which stand upright around the bottom surface 65. The hinge receivers 61 are provided at two locations, namely, on the left and the right side of the rear side surface 66b.

Guide rails 67, having a U-shaped cross section, are attached to the inside of the front side surface 66a and to the inside of the rear side surface 66b. The first carriage 8 and the second carriage 9 (see FIG. 1) reciprocate along the guide rails 67 to scan a document placed on the contact glass 25 (see FIG. 1). The base plate 10 (see FIG. 1), on which the lens barrel 6 and the photoelectric conversion element 7 are positioned, is mounted to the bottom surface 65. The rear side surface 66b has two recessed (protruding inward) throttle portions 70.

Figure 7:
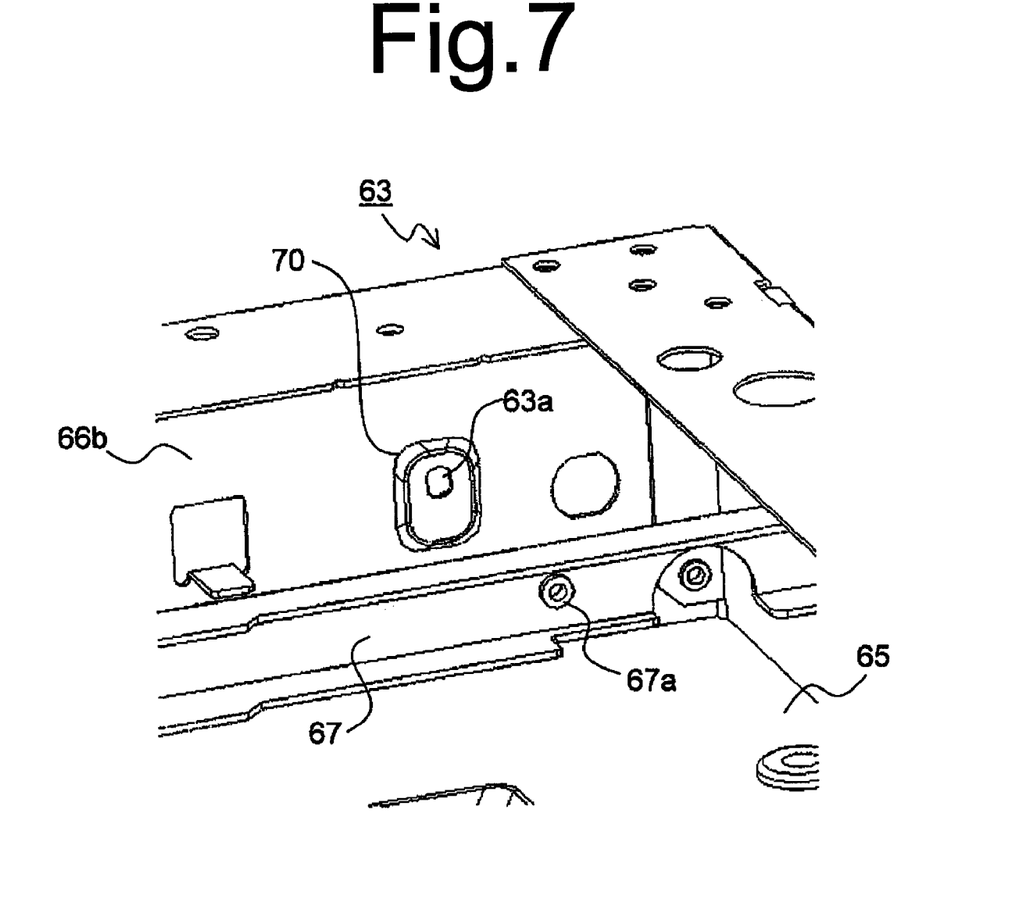
FIG. 7 is an enlarged view of a throttle portion.

FIG. 7 is an enlarged view of one of the throttle portions 70. In this example, the frame 63 is made of a galvanized steel sheet (SECC) having a thickness of 1.6 mm. Substantially rectangular projections having a depth of 2 mm to 3 mm, serving as the throttle portions 70, are provided at the inside of the rear side surface 66b. The throttle portions 70 each have a screw hole 63a. By aligning the screw holes (through-holes) 67a in the guide rail 67 with the screw holes 63a and then screwing screws 71 (see FIG. 8) into these holes, the guide rail 67 is fixed to the rear side surface 66b. The throttle portions 70 are formed by, for example, drawing the rear side surface 66b using a press before assembling the image-reading device 21.

Figure 8:
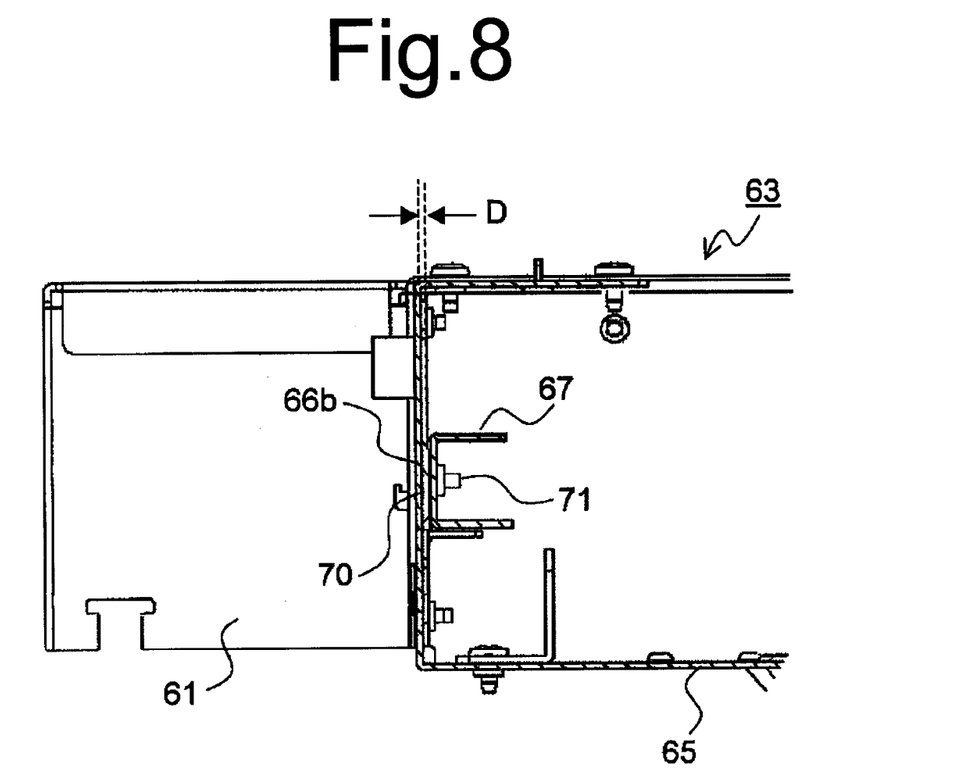
FIG. 8 is a partial cross-sectional view of the rear side surface of the frame.

FIG. 8 is a partial cross-sectional view (cross section taken along line A-A' in FIG. 6) of the vicinity of the rear side surface 66b of the frame 63 constituting the image-reading device according to an embodiment. In the structure according to this embodiment, as shown in FIG. 8, the guide rail 67 is attached to the rear side surface 66b with a gap D equivalent to the depth of the throttle portions 70 therebetween. This prevents deformation of the rear side surface 66b from being transmitted to the guide rail 67, whereby, even if the rear side surface 66b is deformed by the load of the document conveying unit 27, the resulting deformation of the guide rail 67 can be prevented.

Although the shape, number, and arrangement of the throttle portions 70 are not specifically limited, in order to stably fix the guide rails 67, the throttle portions 70 need to be provided at least two locations in the rear side surface 66b. However, as the number of the throttle portions 70 increases, the contact area between the rear side surface 66b and the guide rails 67 increases, allowing the deformation of the rear side surface 66b to be more easily transmitted to the guide rail 67. Accordingly, it is preferable that the throttle portions 70 be provided at two locations in the rear side surface 66b. In order to minimize the distortion or deformation of the throttle portions 70 due to opening and closing of the document conveying unit 27, it is more preferable that the throttle portions 70 are each provided near a corner of the frame 63, at a position as much as possible away from the hinge receivers 61, as shown in FIG. 5.

Although the depth of the throttle portions 70 is set from 2 mm to 3 mm herein, it is not limited thereto. The depth of the throttle portions 70 is appropriately selected according to the thickness and material of the frame, as well as the weight of the document conveying unit, taking into consideration the effect of preventing deformation of the frame 63 and ease of processing. Furthermore, the size of the throttle portions 70 can also be appropriately modified according to the height of the frame 63, the width of the guide rails 67, and the like, within the scope of the present invention.

Figure 9:
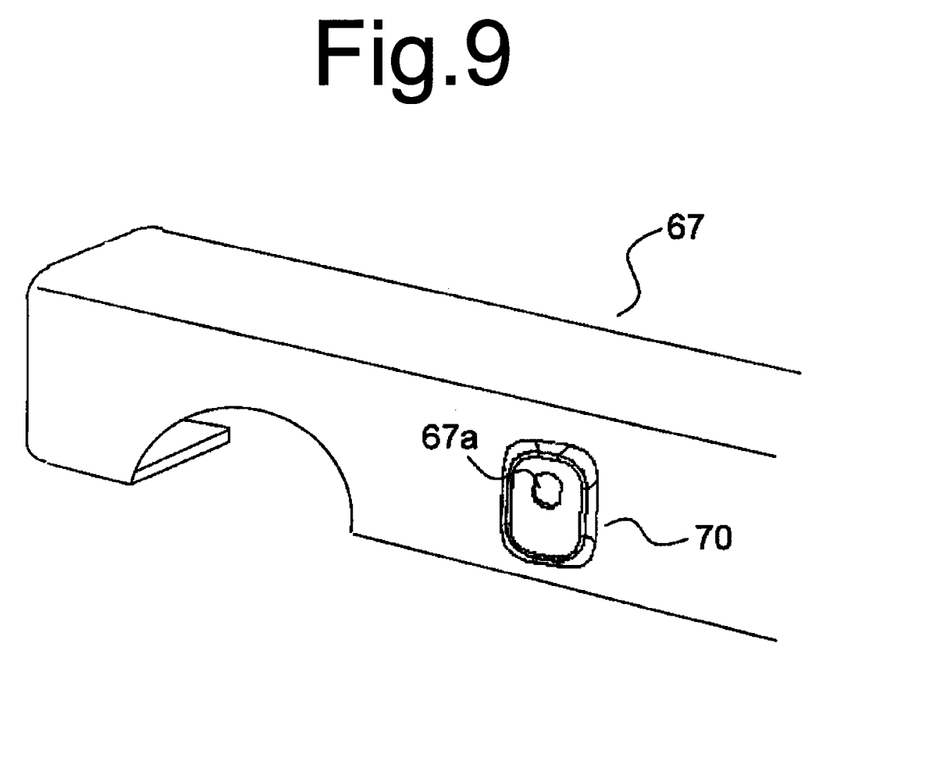
FIG. 9 is a perspective view of an end of a guide rail used in an image-reading device according to another embodiment of the present invention.
Figure 10:
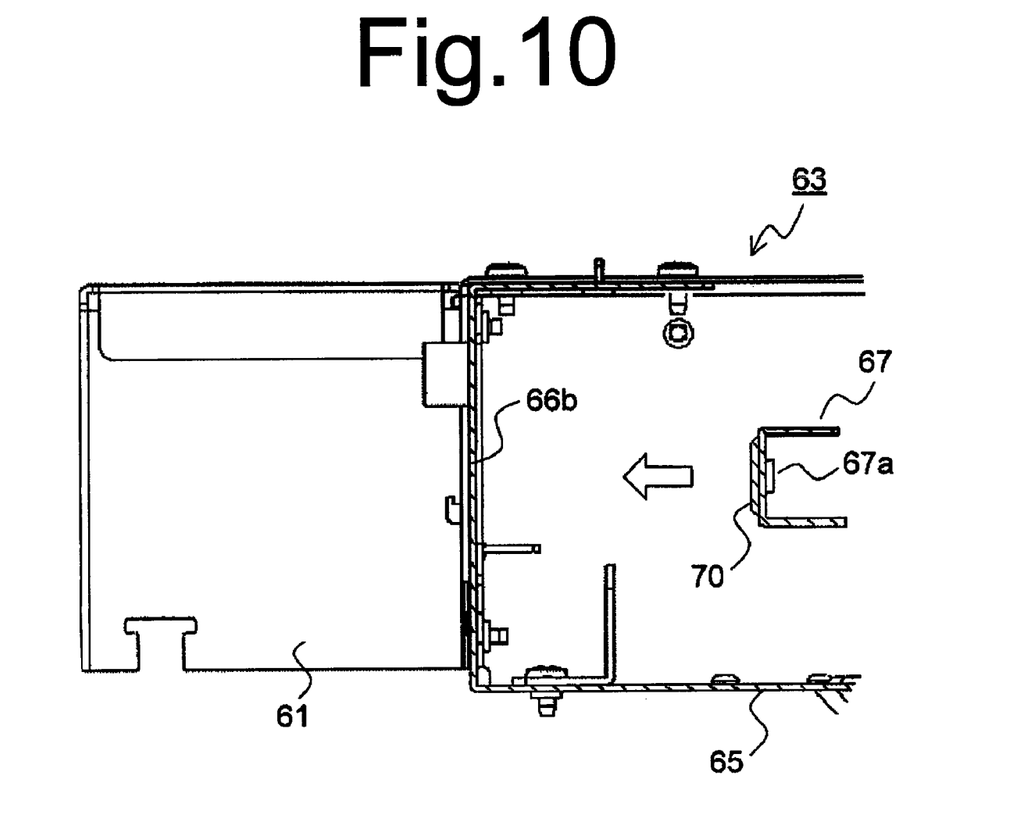
FIG. 10 is a partial cross-sectional view showing the attachment of the guide rail to a rear side surface of a frame of the image-reading device according to the embodiment of FIG. 9.

FIG. 9 is a partial enlarged view of a guide rail 67 used in an image-reading device according to another embodiment of the present invention. FIG. 10 is a partial cross-sectional view showing attachment of the guide rail 67 to the rear side surface 66*b* of the frame 63 constituting the image-reading device according to this embodiment. In the embodiment, the throttle portions 70 are provided in the back surface (a surface to be brought into contact with the rear side surface 66*b*) of the guide rail 67, and the throttle portions 70 are provided with screw holes 67*a*.

In this structure, when the guide rail 67 is fixed to the rear side surface 66*b* with screws, as in the previous embodiment, a gap equivalent to the depth of the throttle portions 70 is formed between the guide rail 67 and the rear side surface 66*b*. Accordingly, deformation of the guide rail 67 resulting from deformation of the rear side surface 66*b* can be prevented. In this embodiment too, it is preferable that the throttle portions 70 are each provided at a position facing near a corner of the rear side surface 66*b*. Similarly to the previous embodiment, the shape etc., of the throttle portions 70 can be appropriately modified.

Figure 11:
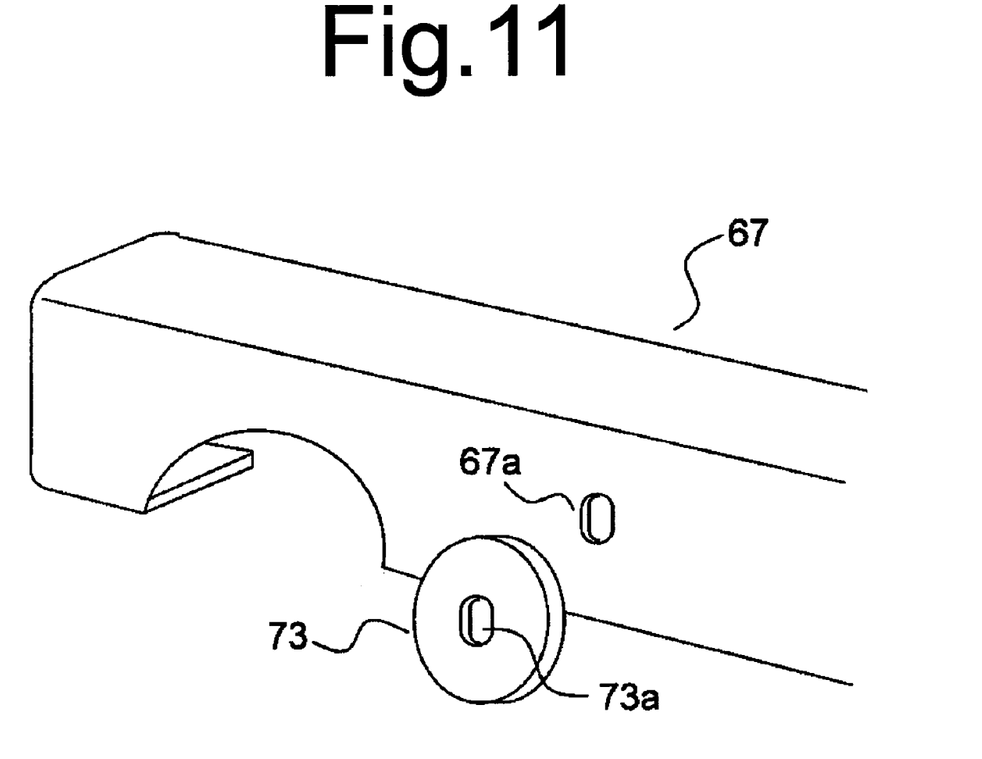
FIG. 11 is a perspective view of an end of a guide rail and a spacer used in an image-reading device according to a further embodiment.
Figure 12:
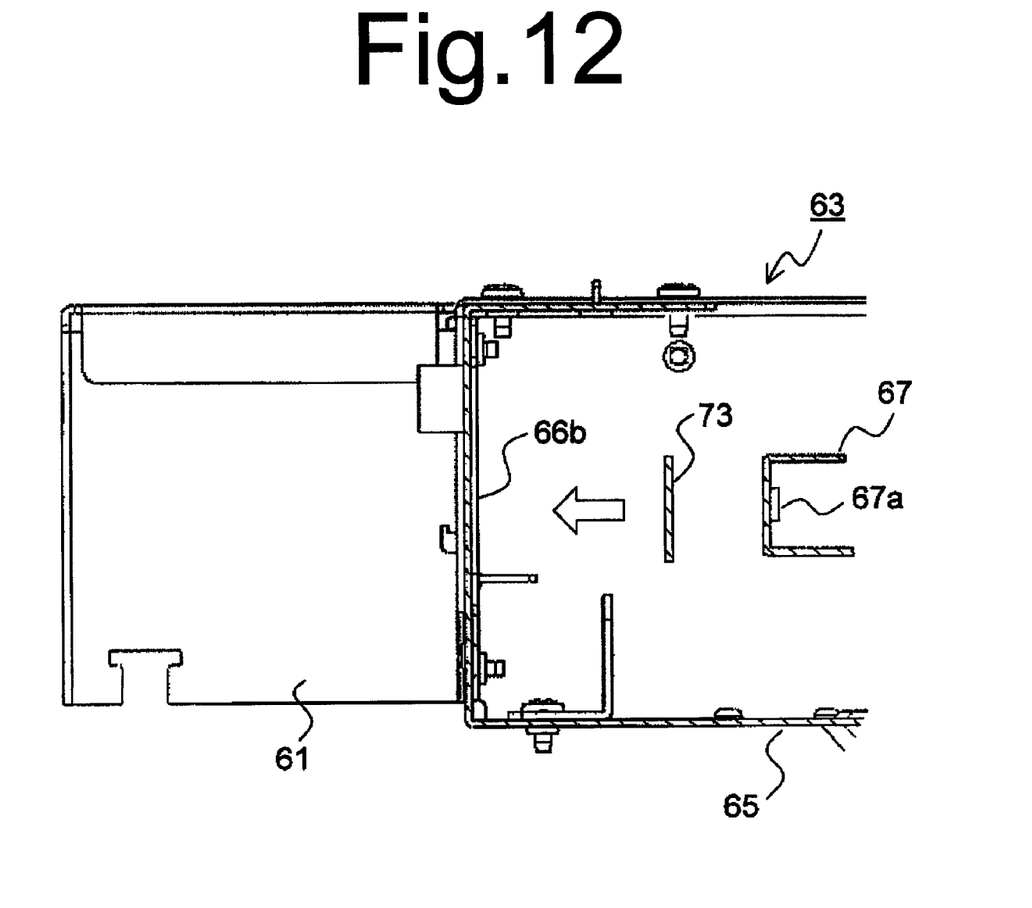
FIG. 12 is a partial cross-sectional view showing attachment of the guide rail to a rear side surface of a frame of the image-reading device according to the embodiment of FIG. 11.

FIG. 11 is a partial enlarged view of a guide rail used in an image-reading device according to a still further embodiment of the present invention. FIG. 12 is a partial cross-sectional view showing attachment of the guide rail 67 to the rear side surface 66*b* of the frame 63 constituting the image-reading device according to this embodiment. In the embodiment, spacers 73 are located between the guide rail 67 and the rear side surface 66*b*, instead of providing the throttle portions 70. By screwing the screws 71 (see FIG. 8) into the screw holes 67*a* in the guide rails 67, the through-holes 73*a* in the spacers 73, and the screw holes 63*a* in the rear side surface 66*b*, the guide rail 67 is fixed.

In this structure, when the guide rail 67 is fixed to the rear side surface 66*b* with screws, a gap equivalent to the thickness of the spacers 73 is formed between the guide rail 67 and the rear side surface 66*b*. Accordingly, as in the other embodiments, deformation of the guide rail 67 resulting from the deformation of the rear side surface 66*b* can be prevented. In this embodiment too, it is preferable that the screw holes 63*a* each be provided at a position near the corner of the rear side surface 66*b* so that the guide rail 67 is fixed to the rear side surface 66*b* at portions near both ends. The spacers 73 may be preliminarily fixed to the guide rail 67 or the rear side surface 66*b*.

The present invention is not limited to the above-described embodiments, and it may be appropriately modified. For example, although the guide rail 67 is fixed to the frame 63 with screws in the above-described embodiments, the guide rail 67 may be fixed to the frame 63 with eyelets, rivets, by welding, or other means.

In addition, although the hinge receivers 61 for supporting the document conveying unit 27 are provided side-by-side outside the frame 63 in the above-described embodiments, the hinge receivers 61 may be provided inside the frame 63. Alternatively, a post extending downwardly from the image-reading device 21 may be provided so that the image-reading device 21 and the main body of the apparatus are connected by the post. Still alternatively, the hinge unit may be directly attached to the frame 63 to support the document conveying unit 27, without providing the post. The present invention is of course applicable to these structures. Furthermore, the present invention is also advantageously used in a structure in which the document conveying unit 27 is not provided on the document holding plate 28.

The present invention is usable in image-reading devices in which the document holding portion is supported so as to be capable of being opened and closed via the hinge unit, and has a structure in which a guide rail is attached to the inside of the side surface, to which the hinge unit is attached, of the frame of the image-reading section in such a manner that only part of the guide rail is directly or indirectly in contact therewith.

Thus, even if the frame of the image-reading section is deformed because of the opening and closing of the document holding plate, resulting influence on the guide rail can be minimized. In particular, even when a heavy document conveying unit is disposed on the document holding plate, the deformation of the guide rail can be effectively restricted. Examples of the method of attaching the guide rail include a method in which the throttle portions are provided on the frame or the guide rail and a method in which spacers are provided between the frame and the guide rail. In particular, when the throttle portions are provided on the frame, the number of components, such as the spacers, and the number of assembling steps can be reduced, and the rigidity of the frame is increased. This reduces deformation of the frame itself, providing a reduction in the thickness and weight of the image-reading device, and hence, of the entire image-forming apparatus having the image-reading device.

By attaching the hinge unit to the side surface of the frame, at positions shifted from the corners toward the center, and by fixing portions near the ends of the guide rail each to a corresponding one of the portions near the corners of the side surface of the frame, the portions at which the guide rail is fixed to the side surface of the frame are less likely to be deformed, whereby the deformation of the guide rail can be restricted to the minimum level.

Using the image-reading device of the present invention, a more compact image-forming apparatus having higher image quality can be provided.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image-reading device comprising:
    a frame;
    a guide rail positioned in the frame;
    an image-reading section positioned in the frame and including a scanning optical unit that scans a document and forms an image on an imaging device, and a carriage that carries the scanning optical unit and is movable along the guide rail;
    a document holding plate that covers a top surface of the image-reading section; and
    a hinge unit attached to the frame and supporting the document holding plate on the image-reading section so as to be rotatable;
    wherein an inside of a side surface of the frame, to which the hinge unit is attached, has a plurality of throttle portions protruding toward the inside of the frame and positioned separately along an extended direction of the guide rail, and the guide rail is attached to the throttle portions.

2. The image-reading device according to claim 1, comprising a document conveying unit that is provided on the document holding plate and feeds the document to a reading position.

3. An image-reading device comprising:
a frame;
a guide rail positioned in the frame;
an image-reading section positioned in the frame and including a scanning optical unit that scans a document and forms an image on an imaging device, and a carriage that carries the scanning optical unit and is movable along the guide rail;
a document holding plate that covers a top surface of the image-reading section; and
a hinge unit attached to the frame and supporting the document holding plate on the image-reading section so as to be rotatable;
wherein a side surface of the guide rail facing to the frame has a plurality of throttle portions protruding toward the frame and positioned separately along an extended direction of the guide rail, and the guide rail is attached to the side surface of the frame via the throttle portions.

4. The image-reading device according to claim 1, wherein the guide rail is attached to the side surface of the frame via a spacer.

5. The image-reading device according to claim 1, wherein a plurality of the hinge units are attached to the side surface of the frame, at positions shifted from the corners toward the center and portions near the ends of the guide rail are each fixed to a corresponding one of the portions near the corners of the side surface of the frame, at a position away from the corresponding hinge unit.

6. An image-forming apparatus comprising:
an image-reading device comprising:
a frame;
a guide rail positioned in the frame;
an image-reading section positioned in the frame and including a scanning optical unit that scans a document and forms an image on an imaging device, and a carriage that carries the scanning optical unit and is movable along the guide rail;
a document holding plate that covers a top surface of the image-reading section; and
a hinge unit attached to the frame and supporting the document holding plate on the image-reading section so as to be rotatable;
wherein an inside of a side surface of the frame, to which the hinge unit is attached, has a plurality of throttle portions protruding toward the inside of the frame and positioned separately along an extended direction of the guide rail, and the guide rail is attached to the throttle portions.

7. An image-forming apparatus comprising:
an image-reading device comprising:
a frame;
a guide rail positioned in the frame;
an image-reading section positioned in the frame and including a scanning optical unit that scans a document and forms an image on an imaging device, and a carriage that carries the scanning optical unit and is movable along the guide rail;
a document holding plate that covers a top surface of the image-reading section; and
a hinge unit attached to the frame and supporting the document holding plate on the image-reading section so as to be rotatable;
wherein a side surface of the guide rail facing to the frame has a plurality of throttle portions protruding toward the frame and positioned separately along an extended direction of the guide rail, and the guide rail is attached to the side surface of the frame via the throttle portions.

8. The image-forming apparatus according to claim 6, wherein the guide rail is attached to the side surface of the frame via a spacer.

9. The image-forming apparatus according to claim 6, wherein a plurality of the hinge units are attached to the side surface of the frame, at positions shifted from the corners toward the center and portions near the ends of the guide rail are each fixed to a corresponding one of portions near the corners of the side surface of the frame, at a position outward of the hinge unit.

10. The image-reading device according to claim 3, comprising a document conveying unit that is provided on the document holding plate and feeds the document to a reading position.

11. The image-reading device according to claim 3, wherein the guide rail is attached to the side surface of the frame via a spacer.

12. The image-reading device according to claim 3, wherein a plurality of the hinge units are attached to the side surface of the frame, at positions shifted from the corners toward the center and portions near the ends of the guide rail are each fixed to a corresponding one of the portions near the corners of the side surface of the frame, at a position away from the corresponding hinge unit.

13. The image-forming apparatus according to claim 7, wherein the guide rail is attached to the side surface of the frame via a spacer.

14. The image-forming apparatus according to claim 7, wherein a plurality of the hinge units are attached to the side surface of the frame, at positions shifted from the corners toward the center and portions near the ends of the guide rail are each fixed to a corresponding one of portions near the corners of the side surface of the frame, at a position outward of the hinge unit.

* * * * *